(12) United States Patent
Formanski et al.

(10) Patent No.: US 6,849,352 B2
(45) Date of Patent: Feb. 1, 2005

(54) FUEL CELL SYSTEM AND METHOD OF OPERATING A FUEL CELL SYSTEM

(75) Inventors: Volker Formanski, Alsenborn (DE); Peter Willimowski, Darmstadt (DE); Bernhard Baaser, Trebur (DE)

(73) Assignee: General Motors Corporation, Detroit, MI (US)

( * ) Notice: Subject to any disclaimer, the term of this patent is extended or adjusted under 35 U.S.C. 154(b) by 400 days.

(21) Appl. No.: 10/100,483

(22) Filed: Mar. 18, 2002

(65) Prior Publication Data

US 2002/0142200 A1 Oct. 3, 2002

(30) Foreign Application Priority Data

Mar. 28, 2001 (DE) .......................................... 101 15 336

(51) Int. Cl.[7] .............................................. H01M 8/04
(52) U.S. Cl. ............................. 429/17; 429/19; 429/34
(58) Field of Search .............................. 429/17, 19, 34

(56) References Cited

U.S. PATENT DOCUMENTS

| | | | |
|---|---|---|---|
| 4,532,192 A | 7/1985 | Baker et al. .................. | 429/19 |
| 4,791,033 A | 12/1988 | Patel ........................... | 429/19 |
| 5,039,579 A | 8/1991 | Kinoshita ..................... | 429/19 |
| 5,059,494 A | 10/1991 | Vartanian et al. ............. | 429/17 |
| 5,068,159 A | 11/1991 | Kinoshita ..................... | 429/16 |
| 5,380,600 A | 1/1995 | Hansen et al. ................ | 429/17 |
| 5,401,589 A | 3/1995 | Palmer et al. ................ | 429/13 |
| 5,736,026 A | 4/1998 | Patel et al. .................. | 205/343 |
| 5,856,034 A | 1/1999 | Huppmann et al. ........... | 429/17 |
| 6,124,054 A | 9/2000 | Gorman et al. ............... | 429/34 |
| 6,514,635 B2 * | 2/2003 | Van Dine et al. ............. | 429/17 |
| 6,551,732 B1 * | 4/2003 | Xu .............................. | 429/17 |

FOREIGN PATENT DOCUMENTS

| | | |
|---|---|---|
| DE | 3913581 | 10/1990 |
| DE | 4425186 | 3/1996 |
| DE | 19548297 | 6/1997 |
| DE | 19904711 | 8/2000 |
| EP | 0180941 | 11/1985 |
| WO | WO9905741 | 2/1999 |

OTHER PUBLICATIONS

German Search Report dated Jul. 24, 2002.

* cited by examiner

*Primary Examiner*—John S. Maples
(74) *Attorney, Agent, or Firm*—Cary W. Brooks

(57) ABSTRACT

A fuel cell system comprising a plurality of fuel cells, in particular in the form of low temperature fuel cells, which are assembled into a stack, the system having a cathode side with a cathode inlet and a cathode outlet, with oxygen or an oxygen containing gas, such as for example air, being capable of being supplied to the cathode inlet and also having an anode side which has an anode inlet and an anode outlet, with hydrogen or a hydrogen rich gas being capable of being supplied to the anode inlet and with a feedback loop being provided in order to return at least a part of the hydrogen containing exhaust gases which arise at the anode outlet back to the anode inlet, characterized by a line which leads from the anode side to the cathode side and is designed to supply anode exhaust gases to the cathode inlet which, after reaction of the hydrogen component with oxygen at the cathode side to form water, leave the fuel cell system with the cathode exhaust gases via the cathode outlet.

21 Claims, 6 Drawing Sheets

FUEL CELL SYSTEM AND METHOD OF OPERATING A FUEL CELL SYSTEM

TECHNICAL FIELD

The present invention relates to a fuel cell system comprising a plurality of fuel cells, in particular in the form of low temperature fuel cells, which are assembled into a stack, the system having a cathode side with a cathode inlet and a cathode outlet, with oxygen or an oxygen containing gas, such as for example air, being capable of being supplied to the cathode inlet and also having an anode side which has an anode inlet and an anode outlet, with hydrogen or a hydrogen rich gas being capable of being supplied to the anode inlet and with a feedback loop being provided in order to return at least a part of the hydrogen containing exhaust gases which arise at the anode outlet back to the anode inlet. Furthermore, the present invention relates to a method for the operation of such a fuel cell system.

BACKGROUND OF THE INVENTION

Fuel cell systems of the initially named kind are in principle known, for example from the International Patent Application with the publication no. WO 99/05741.

With the development of alternative drive concepts for automotive applications the electric drive in combination with a low temperature fuel cell system and an electrochemical energy converter has attained particular importance. The choice of the fuel has an important influence on the complexity of the fuel cell system. When using organic fuels such as methanol or gasoline the complexity of the system increases because of the required conversion of the fuel to form a hydrogen rich gas. The use of pure hydrogen results in a substantial simplification of the system. The pure or contaminated hydrogen gas is then supplied to the fuel cell at the anode side in dependence on the load. At the cathode side oxygen or an oxygen containing gas, above all air, is supplied in accordance with the load. The desired value for the load results essentially from the behaviour of the total vehicle (accelerations, braking, etc.) desired by the driver and also from the power requirement of the electrical consumers which participate in the fuel cell system.

In a customary fuel cell system of the initially named kind air is supplied to the cathode side and consists, in addition to the desired oxygen component, of approximately 80% of nitrogen, which counts here as an inert gas and which forms the main component of the cathode exhaust gases (together with water vapour and a residual oxygen component. However, in the operation of the fuel cells, the nitrogen tends to diffuse through the membranes, which are present there, and appears as an undesired gas component at the anode side. Water also diffuses to the anode side so that the gases present there not only consist of the desired hydrogen component but rather also of the undesired nitrogen component and of water vapour. Accordingly it has previously been customary to dispose of at least a part of the anode exhaust gases at the anode side. Since these anode exhaust gases contain a residual component of hydrogen this must take place by a special catalytic combustion, since it would not be permissible to discharge hydrogen directly into the environment. As hydrogen is a valuable fuel attempts have also already been made to return a part of the anode exhaust gases to the anode side. Nevertheless, as a result of the nitrogen component of the anode exhaust gases which arises in the course of time, the anode exhaust gases must be disposed of by catalytic combustion at the anode side and replaced with fresh hydrogen.

In order to minimize the fuel consumption of a fuel cell vehicle the efficiency of a low temperature fuel cell has an important role to play. The degree of efficiency of a low temperature fuel cell depends, amongst other things, on the oxygen component of the supplied cathode gas and also on the proportion of oxygen in the supplied cathode gas and also in the proportion of hydrogen in the supplied anode gas, i.e. the system architecture which supplies the low temperature fuel cells with gas should be conceived so that the highest possible proportions of oxygen and hydrogen are present in the supplied gas flows. In the operation of low temperature fuel cells exhaust gases arise at the anode outlet which as a rule contained hydrogen. This hydrogen should ideally not leave the vehicle or the fuel cell system in order to achieve the requirement for "zero emissions". Emission means in this context every element which is not present in the air.

SUMMARY OF THE INVENTION

The object of the present invention is to define a fuel cell system and also a method for the operation of the fuel cell system which permits the proportion of hydrogen in the supplied anode gas to be set, so that an ideal fuel cell efficiency results, and also enables hydrogen emissions to be avoided.

In order to satisfy this object a fuel cell system of the initially named kind is provided which is characterized by a line which leads from the anode side to the cathode side and which is to design to supply anode exhaust gases to the cathode inlet which, after reaction of the hydrogen component with the oxygen present at the cathode side to form water, leaves the fuel cell system with the cathode exhaust gases via the cathode outlet.

Method-wise the method of the invention is characterized in that at least a part of the anode exhaust gases is supplied discontinuously, periodically or continuously to the cathode inlet and is discharged with the cathode exhaust gases from the fuel cell system, with the hydrogen component contained in the anode exhaust gases being reacted with the oxygen fed to the cathode side to form water, either at the catalyst present at the cathode side on the fuel cell system or in a device provided with catalyst material inserted upstream of the cathode inlet.

The invention is based on the consideration that the previously practiced combustion of the anode exhaust gases and the apparatus required for this can be dispensed with when the anode exhaust gases are supplied to the cathode side of the fuel cell system and are disposed of with the cathode exhaust gases. Furthermore, the invention is based on the consideration that the hydrogen component of the anode exhaust gases at the cathode side of the fuel cell system can be reacted, by means of the catalyst material which is in any case present there, with the oxygen or atmospheric oxygen supplied to the cathode side in order to form water which can be led out of the fuel cell system without problem. After the catalytic conversion of the hydrogen to water at the cathode side of the fuel cell system, the cathode exhaust gases consist, now as previously, of nitrogen, water and a residual component of oxygen, which are all natural components of the environmental air and thus do not represent noxious emissions.

Particularly preferred variants of the fuel cell system of the invention and also of the method of the invention for the operation of the fuel cell system can be found in the subordinate claims and also in the further description.

BRIEF DESCRIPTION OF THE DRAWINGS

The invention will be described in the following in more detail with reference to the accompanying drawings which show.

DESCRIPTION OF THE PREFERRED EMBODIMENT

Figure 1:
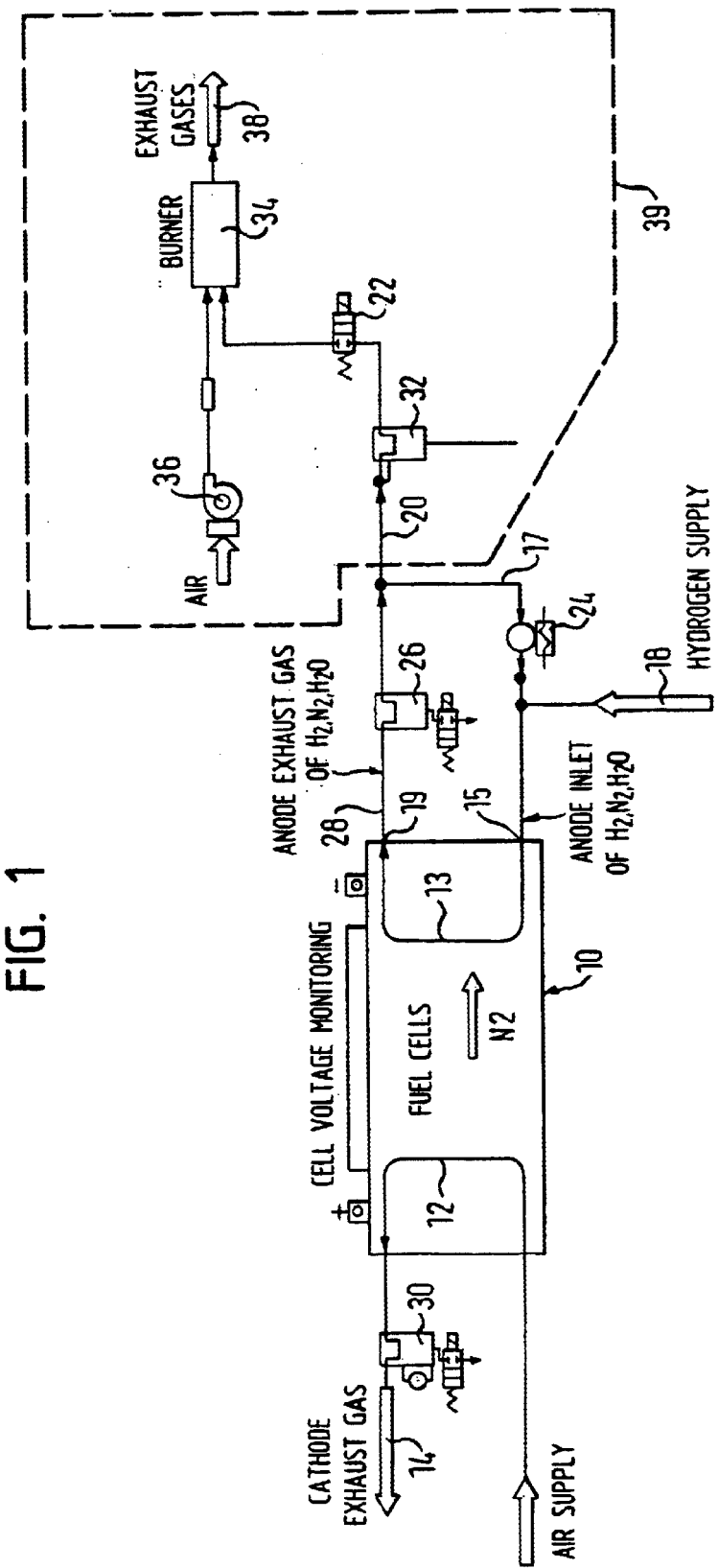
FIG. 1 is a schematic drawing to explain the customary fuel cell system which is to be improved by the invention.

Referring to FIG. 1 the fuel cell system or the fuel cell system architecture shown there consists of a plurality of low temperature fuel cells which are assembled into a so-called stack 11 and which each have an anode and a cathode which are separated from one another by a membrane permeable for protons. Air is supplied to the cathode side 12 of the fuel cells as a deliverer of oxygen, with so-called cathode exhaust gases 14 leaving the vehicle directly. In this connection the exhaust gas only consists of elements which are to be found in the air. In principle the anode side 16 of the fuel cell system forms a closed container 17, which consists of the anode volume itself and of a pipe volume. This container has a gas in-feed in the form of the hydrogen supply 18 and an exhaust gas pipe 20 which can be opened with a valve 22. During the operation of the fuel cell the anode exhaust gas is returned by the anode pump 24 to the anode inlet and is mixed with fresh hydrogen from the hydrogen line 18.

Accordingly an anode circuit 28 is formed. This circuit can contain a water collecting device 26, which collects the water vapour component of the exhaust gases circulating the anode circuit 28 in the form of water. This water can optionally be supplied to a humidifying device for the supplied gases, since low temperature fuel cells fundamentally needs a certain proportion of water vapour in order to keep the membranes moist.

A further water collecting device 30 is located at the cathode side of the fuel cell system in order to also collect water here for humidification purposes.

The problem of this architecture and of the fuel cell in general is that nitrogen diffuses via the fuel cell membranes (not shown) from the cathode side 12 to the anode side 13 of the fuel cells and thus accumulates in the anode container 17 or in the anode circuit. This takes place until a nitrogen partial pressure balance is reached. The accumulation of nitrogen at the anode side 13 leads to the efficiency of the fuel cell sinking as the nitrogen component increases and the hydrogen component correspondingly decreases. This has a negative influence on the hydrogen consumption and thus on the range of the vehicle. In order to prevent the accumulation of nitrogen and to be able to select an ideal concentration of hydrogen, the anode gas mixture is discharged via the valve 22 and thus weakened with respect to the proportion of nitrogen. This hydrogen containing anode exhaust gas mixture is supplied, optionally after extraction of hydrogen components, by means of the device 32 to a catalytic burner 34, is mixed there with air from a fan 36 and combusted catalytically, i.e. the hydrogen component reacts in the burner 34 with atmospheric oxygen to form water while releasing heat. The hydrogen-free exhaust gas 38 is then discharged in emission-free form into the environment.

The disadvantage of this system architecture lies in the fact that all the components in the box 39 (burner, fan, water separator and also the other (not shown) sensors etc.) cause additional cost and weight and take up space.

Figure 2:
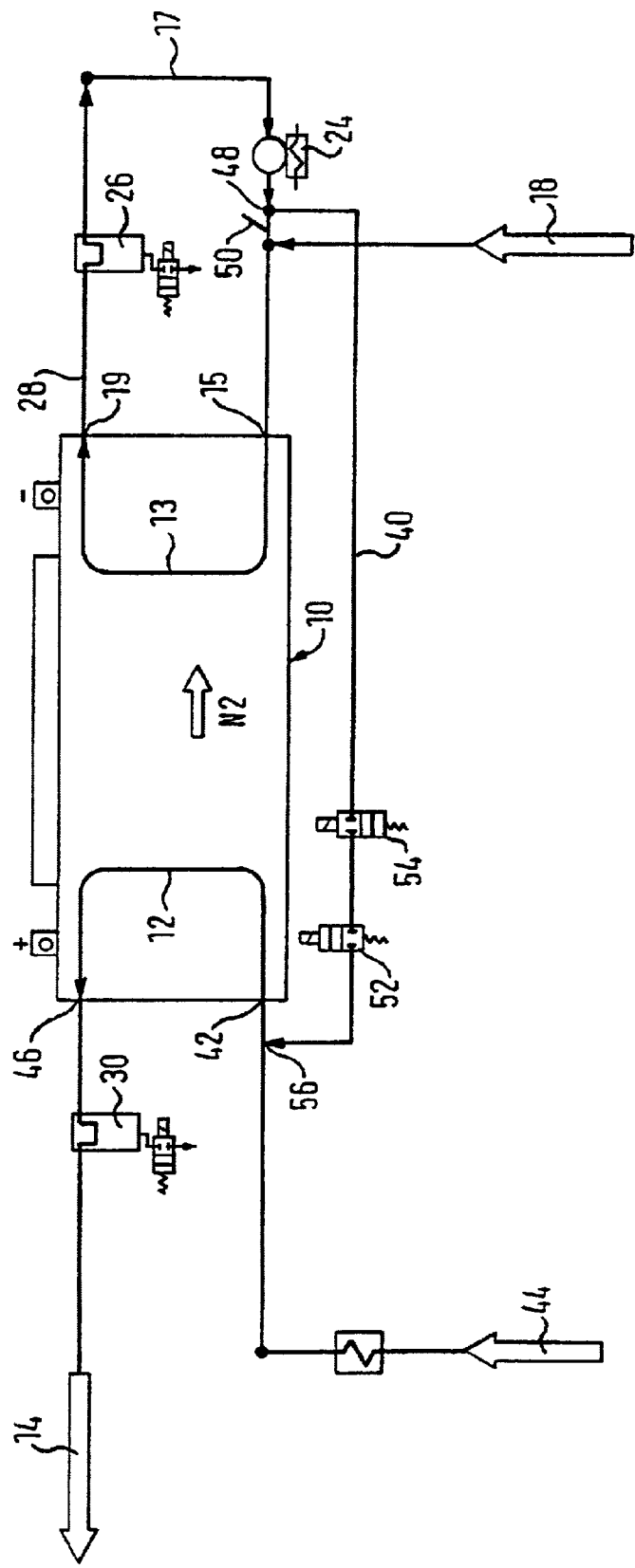
FIG. 2 is a schematic representation of a first variant of the present invention.

In contrast to the previous solution, in a first variant of the solution of the invention in accordance with FIG. 2, the complicated hydrogen combustion by means of an additional burner with all the additional components is avoided.

The reference numerals used in FIG. 2 correspond to those of FIG. 1, that is to say, the same reference numerals are used for parts which have the same design or have the same function and such designs and functions will only be specially described when this appears sensible and necessary in order to point out special features. This manner of proceeding will also be used for the subsequent Figures.

In the above solution the anode exhaust gas (consisting of $H_2$, $N_2$ and $H_2O$) is led directly after the anode exhaust gas pump 24 via a line 40 to the cathode inlet 42 of the fuel cell. There it is mixed with air which is delivered via the line 44 from a non-illustrated compressor. The air/anode exhaust gas mixture which arises there and which contains hydrogen then enters into the cathodes of the fuel cells where it reacts at the fuel cell catalyst. In this reaction hydrogen is reacted with oxygen to form water while liberating heat, as in the catalytic burner. The total exhaust gas which then leaves the cathode side 12 of the fuel cells at the cathode outlet 46 is consequently free of emissions. In order to ensure a gas flow from the anode side to the cathode side, the anode pressure at the point 48 (point of highest pressure related to the anode exhaust gas) is increased relative to the cathode pressure at the cathode inlet 42 in that more hydrogen flows into the anode circuit than is required for the actual fuel cell load. A non-return valve 50 can be used to prevent pure hydrogen passing from the hydrogen supply into the line 40, i.e. the freshly supplied hydrogen displaces the anode exhaust gas mixture from the anode circuit into the line 40. The quantity of anode exhaust gas is so metered with the valve 52 in accordance with the quantity of air supplied at 44 that the air/anode exhaust gas mixture is not able to ignite. The on/off valve 54 serves for the security switch off of the gas flow if the valve 52 malfunctions. Thus this system architecture enables both optimization of the efficiency of the fuel cells by weakening of the nitrogen component as well as guaranteeing freedom from emissions.

Since local overheating can arise at the individual cells adjacent to the cathode inlet 42 of the fuel cell stack, which could damage the membranes, further system architectures are proposed in accordance with the invention which reduce this effect or indeed avoid it.

These system architectures relate to the same system layout as above with the distinction that the mixing point 56 of the anode exhaust gases with the air supply to the cathode side 12 is shifted upstream and additional catalyst surface, which has no direct contact with the fuel cell membranes, is provided between the mixing point 56 and the cathode inlet 42. A reduction in the amount of hydrogen present then takes place at this catalyst surface prior to reaching the fuel cell membranes. In this way the generation of heat at the fuel cell membranes is reduced or indeed avoided. The provision of this catalyst surface can take place in the most diverse manners. In the following some possible embodiments are shown. Solutions with low pressure drops in the cathode supply are to be preferred for reasons of system efficiency.

Figure 3:
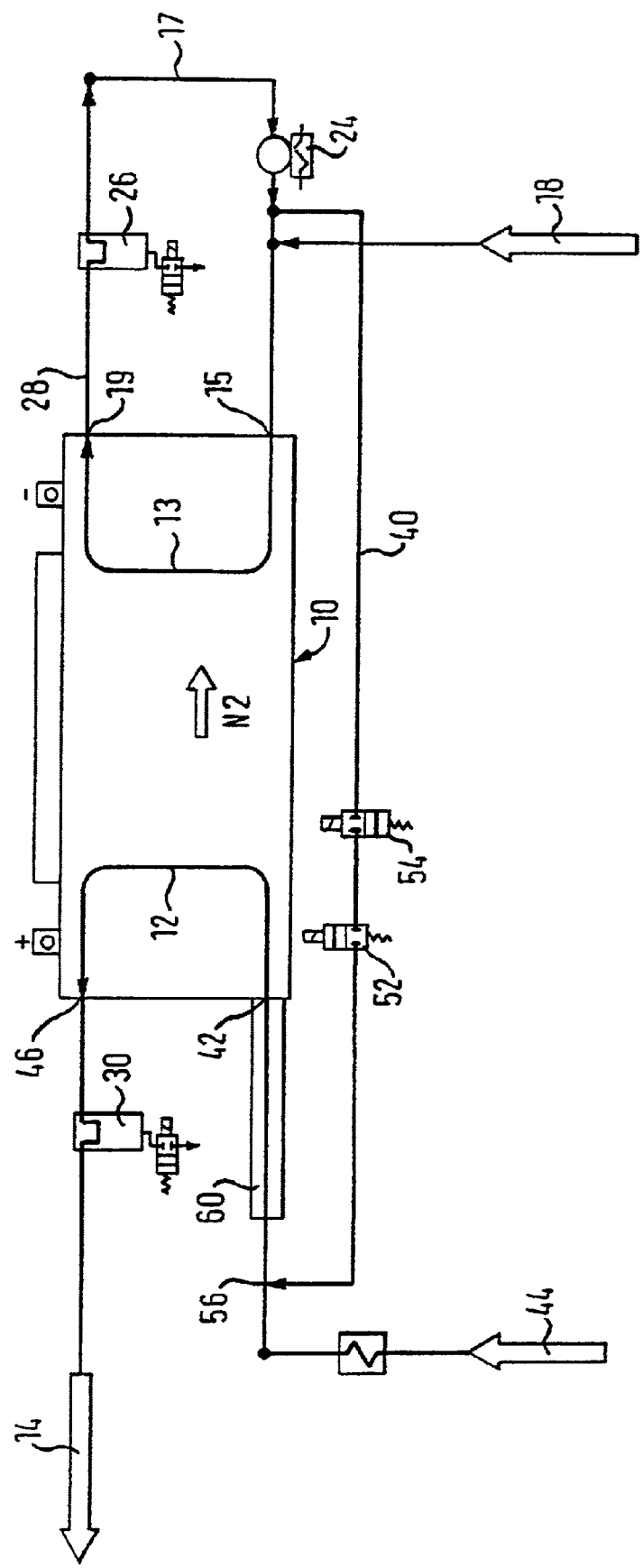
FIG. 3 is a schematic representation of a further variant of the fuel cell system of the invention.

In accordance with FIG. 3 the cathode feed-line is itself coated on the inner side at the upstream side of the cathode inlet 42 with a catalyst, which is schematically illustrated by the reference numeral 60. The cathode feed-line can be a simple tube which is coated at the inner side with a catalyst material or can contain in-built structures coated with catalyst. This coating with catalyst material can also be provided in the region of the cathode inlet or outlet 42. Otherwise the embodiment of FIG. 3 is the same as that of FIG. 2, as is readily shown by the reference numerals that are used.

Figure 4:
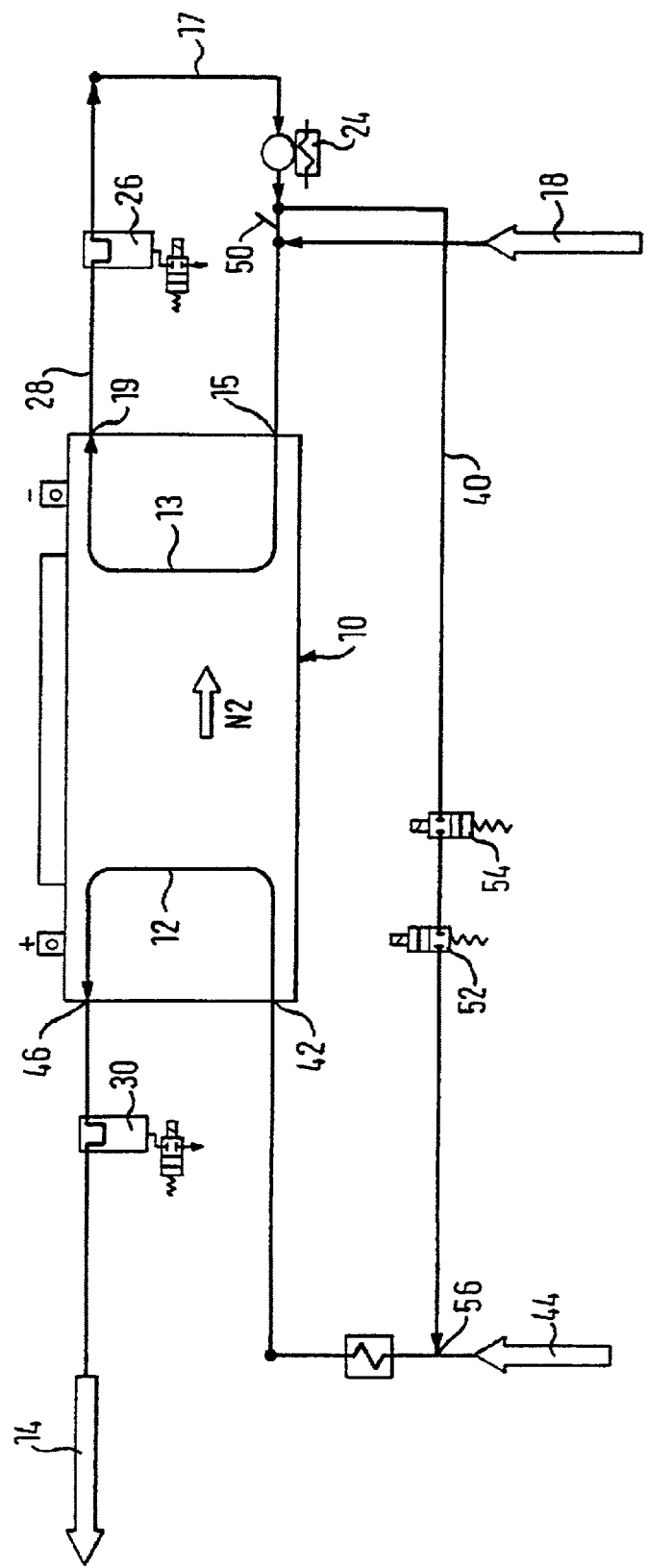
FIG. 4 is a schematic representation of a yet further variant of the fuel cell system of the invention.

In the embodiment of FIG. 4 the mixing point 56 is placed in front of the heat exchanger which is normally provided for the cooling or heating up of the air supplied via the line 44 and the air passages of the heat exchanger through which the air delivered via the line 44 flows are coated with catalyst material. The reference numerals used here also show that the design is in principle basically the same as that in FIG. 2.

Figure 5:
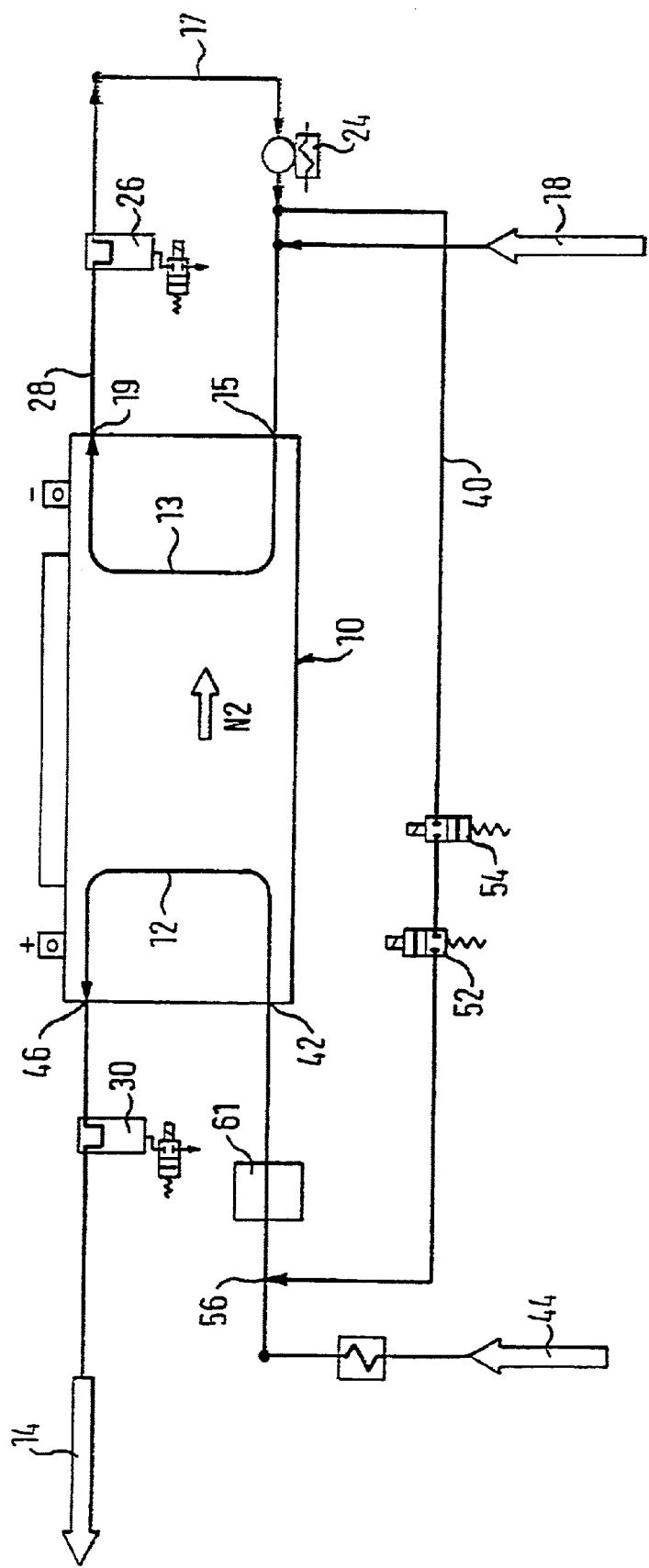
FIG. 5 is a further schematic illustration of a variant of a fuel cell system in accordance with the invention.

This also applies to FIG. 5 where a housing 61 is inserted into the feed-line 44 between the mixing point 56 and the cathode inlet 42. This housing 61 is filled with a catalyst carrier coated with catalyst material. This catalyst carrier can for example be a porous monolith, for example of ceramic material, or a network of metal, for example a fabric manufactured from small metal bands or a random structure of small metal bands, similar to a pot scrubber.

Figure 6:
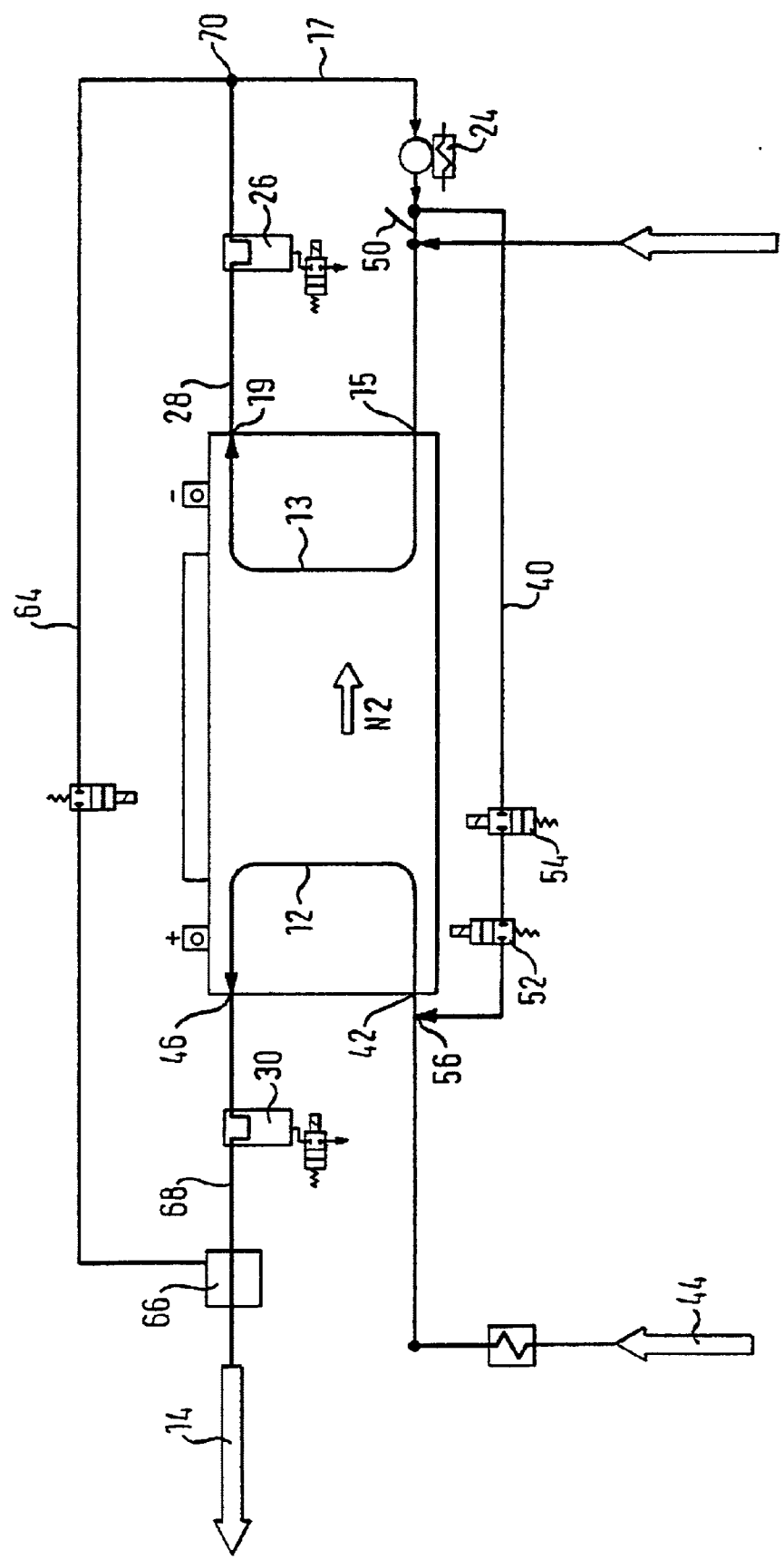
FIG. 6 is a further schematic representation of an alternative embodiment of the fuel cell system of the invention.

A further possibility of improving the previous solution with regard to cost, weight and volume is shown in FIG. 6. In this solution the anode exhaust gas is blown out via two exhaust gas lines, namely the previous line 40 and the further line 64 which leads to an exhaust gas mixing device 66 which is inserted into the cathode exhaust gas line 68 downstream of the cathode outlet 46 and of the water collection device 30. In this way the quantity of hydrogen in the anode exhaust gas which is supplied into the cathode inlet is reduced. The heat of reaction at the membrane is thus likewise reduced. The anode exhaust gas which flows from the point 70 of the exhaust gas mixing device 66 via the line 64 is so mixed with the cathode exhaust gas in the exhaust gas mixing device 66 that the hydrogen component in the total exhaust gas lies clearly below the ignition limit. The disadvantage of the solution lies in the fact that small quantities of hydrogen leave the vehicle and enter into the environment.

In all the previously described embodiments the anode exhaust gas is normally led continuously or discontinuously to the cathode side of the fuel cell system and indeed this is always done when the concentration of nitrogen and/or water vapour at the anode side threatens to exceed a fixed threshold or a threshold which can be variably preset. There is, however, basically also the possibility of continuously supplying a fixed or variable proportion of the gases circulating in the anode circuit 28 continuously to the cathode side 12 of the fuel cell system 10. In order to realize this variant a branching valve (not shown) must then be provided which determines the envisaged quantity of the branched-off exhaust gases.

Although, in the previous Figures, the line 40 has been branched off from the anode circuit 28 after the pump 24, as seen in the flow direction, the branching off could also take place in front of the pump 24. In this way, the non-return valve 50 shown in FIG. 2 could be dispensed with, since the pump 24 itself takes care of the required separation from the hydrogen supply 18. The possibility also exists of driving the pump 24 by the hydrogen supply as is for example described in the German patent application 100 62 673.4 of the present assignee.

In comparison to the previous solution, clear cost, weight and volume advantages result. Finally, it is noted that the fuel cell system of the invention can be used both with pure hydrogen and also with a hydrogen-rich synthesised gas, which is for example obtained by reformation.

What is claimed is:

1. A fuel cell system comprising a plurality of fuel cells, in particular in the form of low temperature fuel cells, which are assembled into a stack and are adapted to permit oxygen or an oxygen containing gas to react with hydrogen or a hydrogen containing gas to generate electricity and produce first exhaust gases containing residual oxygen and second exhaust gases containing residual hydrogen, said system comprising:

a cathode side with a cathode inlet for receiving said oxygen or oxygen containing gas and a cathode outlet for said first exhaust gases;

an anode side with an anode inlet for receiving said hydrogen or hydrogen containing gas, an anode outlet for said second exhaust gases;

a feedback loop for returning at least a part of the second exhaust gases arriving at the anode outlet back to the anode inlet; and a line which leads from the anode side to the cathode side and is designed to supply second exhaust gases to the cathode inlet which, after reaction of said residual hydrogen with oxygen at said cathode side to form water, leave the fuel cell system with said first exhaust gases via said cathode outlet.

2. A fuel cell system in accordance with claim 1, said system further having a switching valve which can be switched on and off and which is provided in said line.

3. A fuel cell system in accordance with claim 1, said system further having a control valve which controls or regulates the quantity of second exhaust gases flowing through said line.

4. A fuel cell system in accordance with claim 3, characterized in that said control valve is provided in said line at the downstream side of the switching valve.

5. A fuel cell system in accordance with claim 1, said anode side of said fuel cell system belonging to an anode circuit including said feedback loop, said system further having a branch point in said anode circuit at which said line branches off from said anode circuit, a hydrogen supply point for supplying said hydrogen or hydrogen containing gas to said anode circuit, said hydrogen supply point being provided in said anode circuit downstream of said branch point, and a non-return valve provided between said hydrogen supply point and said branch point.

6. A fuel cell system in accordance with claim 5, said system further having an exhaust gas pump provided in the anode circuit.

7. A fuel cell system in accordance with claim 6, said branch point for said line being provided in said anode circuit downstream of said exhaust gas pump.

8. A fuel cell system in accordance with claim 6, said branch point for said line being provided in said anode circuit upstream of said exhaust gas pump.

9. A fuel cell system in accordance with claim 6, said anode exhaust gas pump being adapted to be driven by the hydrogen or hydrogen containing gas supplied to said anode circuit.

10. A fuel cell system in accordance with claim 1, there being a fuel cell catalyst at said cathode side for the reaction of said residual hydrogen of said second exhaust gases with oxygen at the cathode side to form water.

11. A fuel cell system in accordance with claim 1, said cathode side including a cathode supply line for supplying said oxygen or oxygen containing gas to said cathode inlet, a catalyst being provided as a coating within said cathode supply line, said line being designed to lead said second exhaust gases to said cathode supply line upstream of said fuel cell catalyst.

12. A fuel cell system in accordance with claim 1, said cathode side including a heat exchanger with a catalyst coating arranged before said cathode inlet and said line being designed to lead said second exhaust gases to said cathode side upstream of said heat exchanger.

13. A fuel cell system in accordance with claim 1, said cathode side including a housing disposed upstream of said cathode inlet, a flow permeable body accommodated in said housing and coated with a catalyst, said line being designed to supply the anode exhaust gases directly or indirectly into said housing and thus to said cathode side.

14. A fuel cell system in accordance with claim 13, said flow permeable body comprising a material network.

15. A fuel cell system in accordance with claim 13, said flow permeable body comprising a porous monolith.

16. A fuel cell system in accordance with claim 1, said system further having an exhaust gas mixing device located downstream of said cathode outlet, a second line which leads from said anode side to said exhaust gas mixing device, said exhaust gas mixing device being designed to mix second exhaust gases branched off via said second line with said first exhaust gases received from said cathode outlet.

17. A fuel cell system in accordance with claim 16, said system further having a valve incorporated into said second line.

18. A method of operating a fuel cell system comprising a plurality of fuel cells, in particular in the form of low temperature fuel cells, assembled into a stack and are adapted to permit oxygen or an oxygen containing gas to react with hydrogen or a hydrogen containing gas to generate electricity and produce first exhaust gases containing residual oxygen and second exhaust gases containing residual hydrogen, said system comprising:

a cathode side with a cathode inlet for receiving said oxygen or oxygen containing gas and a cathode outlet for said first exhaust gases;

an anode side with an anode inlet for receiving said hydrogen or hydrogen containing gas, an anode outlet for said second exhaust gases; and a feedback loop for returning at least a part of the second exhaust gases arriving at the anode outlet back to the anode inlet, said method comprising the step of supplying at least a part of said second exhaust gases continuously or discontinuously to said cathode inlet and discharging them with said first exhaust gases from said fuel cell system, with said residual hydrogen contained in said second exhaust gases being reacted with said oxygen or oxygen containing gas at said cathode side to form water at the catalyst present at said cathode side.

19. A method in accordance with claim 18, including the step of controlling the quantity of second exhaust gases supplied to the cathode side by means of a valve, so that on mixing of the second exhaust gases with oxygen or an oxygen containing gas supplied to said cathode side to form a mixture having an ignition limit, the residual hydrogen contained in said mixture lies beneath said ignition limit.

20. A method in accordance with claim 18, including the step of supplying additional hydrogen to said anode side when supplying second exhaust gases to said cathode side in order to flush the fuel cells at said anode side with hydrogen and to ensure a higher hydrogen concentration at said anode side.

21. A method in accordance with claim 18, including the further step of mixing at least a part of said second exhaust gases with said first exhaust gases downstream of said cathode outlet.

* * * * *